United States Patent [19]

Tsuchida et al.

[11] 4,104,466

[45] Aug. 1, 1978

[54] POLYMERIC METAL COMPLEX AND METHOD OF MANUFACTURING THE SAME

[75] Inventors: Eishun Tsuchida, 1-141, Seki-machi, Nerima-ku, Tokyo, Japan; Kenji Honda, Tokyo, Japan

[73] Assignee: Eishun Tsuchida, Seki, Japan

[21] Appl. No.: 555,134

[22] Filed: Mar. 4, 1975

[30] Foreign Application Priority Data

Mar. 13, 1974 [JP] Japan ............................... 49-28858
Jun. 14, 1974 [JP] Japan ............................... 49-67806

[51] Int. Cl.$^2$ ........................................... C07D 207/20
[52] U.S. Cl. .................................. 542/433; 260/314; 252/431 C; 252/431 N
[58] Field of Search ..................... 252/431 N, 477 R; 423/219; 204/159.24; 260/240 D, 314; 543/433

[56] References Cited

U.S. PATENT DOCUMENTS

| | | | |
|---|---|---|---|
| 2,850,445 | 9/1958 | Oster | 204/159.24 X |
| 2,861,005 | 11/1958 | Siegel | 260/314.5 X |
| 2,950,237 | 8/1960 | Sharp | 260/314 X |
| 2,951,798 | 9/1960 | Sharp | 260/314 X |
| 2,951,799 | 9/1960 | Sharp | 260/431 N UX |
| 2,951,800 | 9/1960 | Sharp | 260/314 X |
| 3,267,115 | 8/1966 | Katon | 260/314 |
| 3,287,334 | 11/1966 | Kropa | 252/431 N X |
| 3,637,739 | 1/1972 | Lamure | 260/314 |
| 3,687,863 | 8/1972 | Wacher | 260/314 X |
| 3,794,604 | 2/1974 | Throckmorton et al. | 252/431 N X |
| 3,859,417 | 1/1975 | Teller | 423/219 X |

OTHER PUBLICATIONS

Adler; A. D., "The Chem. & Phys. Behavior of Porphyrin Comp'ds & Structure" N. Y. Acad. of Sciences, vol. 206, Annals of the N. Y. Acad. of Sci., 1973.
Falk; J. E., "Porphyrins & Metalloporphyrins " BBA Library Elsevier Pub. Co., 1964.
Tsutsui et al., "Unusual Metalloporphyrins . . ." in J. Amer. Chem. Soc., 91:12, 6/1969, pp. 3337-3341.
Adler; A. D., "Solid State Possibilities of Porphyrin Structures" Proc. International Conf. on Organic Semiconductors, J. Polymer Sci. Part C., No. 29, pp. 73-79 (1970).
Stoll; A., "Einfuhrung a die Chemie der Haimine" in Experiantia, vol. IV, 1948, pp. 6-12.
Collman et al., ". . . Hemoprotein" in J. Am. Chem. Soc. USA, vol. 96, No. 8 - 2629-2631.

*Primary Examiner*—Allen B. Curtis
*Attorney, Agent, or Firm*—Bacon & Thomas

[57] ABSTRACT

A polymeric metal complex capable of reversibly adsorbing oxygen to itself and desorbing oxygen therefrom, whose central metal is a low valency transition metal selected from the group consisting of metals belonging to Groups VIA, VIIA, VIII, IB and IIB of the fourth to the sixth periods of the periodic table; whose panar ligand is a chelate ligand selected from the group consisting of bi-, ter- and quadri-dentate monomeric ligands; and whose axial ligand is a polymeric ligand containing a functional group having a coordinating capacity. The subject polymeric metal complex is manufactured by the method which is characterized in that (A) a monomeric metal complex whose central metal is a low or high valency transition metal selected from the group consisting of metals belonging to Groups VIA, VIIA, VIII, IB and IIB of the fourth to the sixth periods of the periodic table and whose ligand is a chelate ligand of any of the bi-, ter- and quadri-dentate ligands is reacted with a polymeric ligand to replace the axial ligand of said monomeric metal complex by said polymeric ligand, or (B) the central metal of said monomeric metal complex is combined with the residual group of a polymeric compound to provide a α bond between carbon and metal, and that where the central metal of said monomeric metal complex is a high valency transition metal, then said central metal is reduced to a low valency state by a chemical reaction using a reducing agent or another form of reaction using an electrode before, after or simultaneously with the aforesaid reaction (A) or (B).

9 Claims, 8 Drawing Figures

(1) MONOMERIC PYRIDINE LIGAND
(2) PARTIALLY QUATERNIZED POLY-VINYLPYRIDINE LIGAND

POLYMERIC METAL COMPLEX AND METHOD OF MANUFACTURING THE SAME

This invention relates to a polymeric metal complex whose important feature is its capacity of reversibly adsorbing oxygen to itself and desorbing oxygen therefrom and also to the method of manufacturing the same.

To date, various processes have been reported on the manufacture of a monomeric metal complex capable of adsorbing oxygen to itself. The typical type of these processes consists in reacting bi-, ter-, and quadri-dentate monomeric chelate ligands such as histidine, bis(-salicylaldehyde) ethylene diamine, dimethylglyoxime, indigo, diethylenetriamine, porphyrin, chlorophyllin, and phthalocyanine with metal ions such as Co(II), Fe(II), Mn(II), Ni(II), Cr(II), Zn(II) and Cu(I) to provide a complex. Some of the prior art monomeric metal complexes can indeed effectively adsorb oxygen to themselves in a crystallized state. But they have the drawbacks that they are soluble only in particular organic solvents, for example, dimethyl formamide (DMF), dimethyl sulfoxide (DMSO), and pyridine, and that while remaining in a solution, particularly in an aqueous solution, the monomeric metal complex has its central metal irreversibly oxidized to a high valency state to be deactivated. Further in recent years, J. E. Baldwin and J. Huff, J. Amer. Chem. Soc., 95, 5757 (1973); J. P. Collman and C. A. Reed, J. Amer. Chem. Soc., 95, 2049 (1973); and C. K. Chang and T. G. Traylor, J. Amer. Chem. Soc., 95, 5810 (1973) report monomeric metal complexes capable of reversibly adsorbing oxygen to themselves and desorbing oxygen therefrom in a solution state at a temperature below −50° C and moreover preventing the central metal thereof from being oxidized. However, the proposed monomeric metal complexes are still handicapped by the fact that though not oxidized at the above-mentioned low temperature, the central metal of said monomeric metal complexes is irreversibly oxidized at around room temperature.

When brought into contact with a high polar solvent such as water, any of the prior art monomeric metal complex has its central metal irreversibly oxidized, unavoidably leading to the decomposition of an oxygenated metal complex. This is due to the fact that irreversible oxidation (discharge) of the central metal in the second stage of the process expressed by the following formula (1) is promoted in a polar solvent.

It is accordingly an object of this invention to provide a novel polymeric metal complex readily soluble in various solvents and capable of reversibly adsorbing oxygen to itself and desorbing oxygen therefrom and the method of manufacturing the same.

Another object of the invention is to provide a novel polymeric metal complex capable of adsorbing oxygen with a higher saturation of oxygen and a more speedy oxygen-uptaking rate than the prior art monomeric metal complexes and also the method of manufacturing the same.

Now, let it be assumed that a polymeric metal complex has such structure that a monomeric ligand occupies the planar coordination site of a central metal ion having a strong affinity for oxygen and that a polymeric ligand is positioned in the remaining axial coordination site. The resulting polymeric metal complex has the axial ligand replaced by a polymeric ligand, offering the following advantages.

(i) It is possible to provide a metal complex soluble in various solvents. Particularly, where the polymeric ligand is formed of a water-soluble polymer, then a water-soluble polymeric metal complex will be obtained.

(ii) Since the central metal ion can be located in a hydrophobic environment within a polymer chain, the resultant polymeric metal complex has its central metal ion little irreversibly oxidized, even when remaining in a solution, thereby attaining the stabilization of the oxygenated polymeric metal comaplex formed.

(iii) Since a plurality of metal complexes are bondable with a polymer chain in any desired ratio, the cooperative action of these metal complexes can be attained. Therefore it is possible to provide an S-shaped oxygen equilibrium curve, namely, to expect an allosteric effect in the adsorption and desorption of oxygen.

This means the advantage that the adsorption and desorption of oxygen can be completed at once over the range of 0 to 100% by any slight change in the partial pressure of oxygen. This advantage is an important factor in considering the effect of repeatedly carrying out the adsorption and desorption of oxygen.

Based on the above assumption, the present inventors have carried out various experiments and succeeded in providing a novel polymeric metal complex capable of adsorbing oxygen to itself and desorbing oxygen therefrom and developing a method for manufacturing the same.

According to an aspect of this invention, there is provided a polymeric metal complex capable of adsorbing oxygen to itself and desorbing oxygen therefrom, whose central metal is a low valency transition metal selected from the group consisting of metals belonging to Groups VIA, VIIA, VIII, IB and IIB of the fourth to the sixth periods of the periodic table; whose planar ligand is a chelate ligand selected from the group consisting of bi-, ter-, and quadri-dentate monomeric ligands; and whose axial ligand is a polymeric ligand containing a functional group having a coordinating capacity.

The polymeric metal complex of this invention is prepared by the method which is characterized in that (A) a monomeric metal complex whose central metal is a low or high valency transition metal belonging to Groups VIA, VIIA, VIII, IB and IIB of the fourth to the sixth periods of the periodic table and whose ligand is a chelate ligand selected from the group consisting of bi-, ter-, and quadri-dentate monomeric ligands is reacted with a polymeric ligand to replace the axial ligand of said monomeric metal complex by said polymeric ligand, or (B) the central metal of said monomeric metal complex is reacted with the residual group of a polymeric compound to provide a σ bond between carbon and metal and that where the central metal of said monomeric metal complex is a high valency transition metal, then said central metal is reduced to a low valency state by a chemical reaction using a reducing agent, or another form of reaction using an electrode before, after or simultaneously with the above-mentioned reaction (A) or (B).

This invention can be more fully understood from the following detailed description when taken in conjunction with the accompanying drawings, in which.

The central metal of a polymeric metal complex according to this invention which is required to have a strong affinity for oxygen should be selected from the group consisting of low valency transition metals belonging to Groups VIA, VIIA, VIII, IB and IIB of the fourth to the sixth periods of the periodic table, such as Cr(II), Mn(II), Fe(II), Co(II), Ni(II), Cu(I), Ag(I), Au(I), Zn(II), Cd(II), Pt(II), Ir(II) and Hg(II), preferably from the group consisting of Cr(II), Mn(II), Fe(II), Co(II), Cu(I), Zn(II) and Ni(II).

Monomeric metal complexes such as cobalamin, salcomin and hemin, any of which can be used as a starting material of a polymeric metal complex according to this invention are generally prepared by the known process of reacting, for example, chlorides, bromides, cyanides, sulfates, nitrates, nitrites, acetates, carbonates and perchlorates of low or high valency transition metals belonging to Groups VIA, VIIA, VIII, IB and IIB of the fourth to the sixth periods iof the periodic table with monomeric bi-, ter- and quadri-dentate chelate ligands. For details of the manufacturing process, refer to Chapter 2 "Manufacturing Method" of Lecture 11 on the Chemistry of Complexes in "Experimental Chemistry" edited by the Chemical Society of Japan.

Most preferred among the numerous known bi-, ter- and quadri-dentate chelate ligands are those having a broad $\pi$- conjugate system. The typical bidentate ligands include histidine, p-(2-pyrrolylmethyleneimino)styrene, 3-(2-pyrrolylmethyleneimino)propene-1, dimethylglyoxime (DMG), acetylacetone (acac), bis(-salicylaldehyde)ethylenediamine, indigo, ethylenediamine (en), bis(acetylacetone)ethylenediamine (baen), bipyridyl (bipy) and phenanthroline (phen). The typical terdentate chelate ligands include diethylenetriamine (dien), iminodiacetic acid (IDA) and nitrilotriacetic acid (NTA). The typical quadridentate ligands include porphyrins (for example, protoporphyrin IX), chloropyllin, phorphyradine and phthalocyanine. Preferred are histidine, 3-(2-pyrrolylmethyleneimino)propene-1, dimethylglyoxime, acetylacetone, bis(salicylaldehyde)ethylenediamine, indigo, bis(acetylacetone)ethylenediamine, phenanthroline, porphyrins, chlorophyllin, porphyradine and phthalocyanine. Concrete monomeric metal complexes obtained by reacting salts of the above-mentioned metal with a bi-, ter-, or quadridentate chelate ligand include chlorohemin, tris[3-(2-pyrrolylmethyleneimino) propene-1-ato] Co(III), Co(II)-DMG, Co(II)-acac, trans Na[Co(DMG)$_2$Cl$_2$], trans Na[Co(acac)$_2$(NO$_2$)$_2$], trans [Co(baen)(H$_2$O)$_2$]ClO$_4$, Ni-DMG, Mn-phthalocyanine, Cr-(DMG)$_2$Cl and the like.

A polymeric metal complex according to this invention is prepared by (A) reacting the aforesaid monomeric metal complex with a polymeric ligand to replace said monomeric metal complex by said polymeric ligand, or (B) reacting the central metal of said monomeric metal complex with the residual group of a polymeric compound to provide a carbon-metal covalent ($\sigma$) bond.

Polymeric ligands used in the ligand exchange reaction (A) are polymeric compounds having a coordinating capacity such as a primary amino group, secondary amino group, tertiary amino group, nitrogen-containing heterocyclic ring, Schiff base, carboxyl group and hydroxyl group. Most preferred are those having the nitrogen-containing heterocyclic ring. As used herein, the term "polymers" is defined to exclude monomers and include compounds ranging from the so-called oligomers of low molecular weight to high molecular compounds.

The polymeric ligands include polyethyleneimine of different molecular weights, polyamino acids containing many amino groups in the side chain (for example, poly-L-lysine and polyglutamic acid), polyvinylpyridine, polyvinylimidazole, poly-p-(2-pyrrolylmethyleneimino)styrene, polyacrylic acid, polymethacrylic acid, pectic acid, polyvinyl alcohol, polyvinylpyridine or polyvinylimidazole having some of the quaternized nitrogen atoms later subjected to quaternization, derivatives prepared by introducing an aromatic ring containing a nitrogen atom as a ring constituent (for example, pyridine, imidazole and histidine) or nucleic acid base (for example, adenine) and copolymers of vinylpyridine, vinylimidazole, etc. with N-vinylpyrrolidone, acrylamide, acrylic acid, etc. Particularly preferred are such polymers having a nitrogen-containing group as homopolymers or copolymers of vinylpyridine and vinylimidazole, and polyamino acid (for example, poly-L-lysine).

A ligand-exchange reaction between the monomeric metal complex and the polymeric ligand is generally carried out in a solution at room temperatures (25° to 30° C) with stirring. This reaction is completed in about 5 to about 15 minutes. The solvent used in this reaction is the one which can dissolve both reactants or a mixture of a solvent capable of dissolving one of the reactants and another solvent capable of dissolving the other. Though the solvent varies with the form of monomeric metal complex and polymeric ligand actually used, the former type of solvent includes dimethylformamide, methanol and water, and the latter type includes dimethylformamide-water, dimethylformamide-methanol and dimethylformamide-tetrahydrofuran.

The polymeric ligand and monomeric metal complex are charged in a reactor in the molar ratio of 1:1 to 10,000:1, preferably 100:1 to 1,000:1. Namely, the former reactant is used in large excess. This is for the reason that it is necessary to choose the condition in which a hydrophobic environment can be easily produced by interaction between the polymeric ligand and a secondary component as hereinafter described, particularly polymer and also increase the amount of monomeric metal complex effectively combined with said polymeric ligand. It should be noted that the above-mentioned ligand-exchange reaction may be effected not only in a homogeneous solution but also in the form of a suspension or paste.

The residual group of a polymeric compound used in the aforesaid (B) reaction with the central metal of the monomeric metal complex so as to provide a carbon-metal bond either reacts with metallic magnesium or with a Grignard reagent expressed by the general formula RMgX (where R is an alkyl group, and X is a halogen group) to provide a polymeric Grignard reagent. The above-mentioned polymeric compounds are, for example, those whose side chain includes a functional group such as halogen, halogenated alkyl, alcohol and ketone. For illustration, homopolymers of vinyl monomers containing a halogenated alkyl group such as p-chloromethyl styrene and chloroethyl vinyl ether and copolymers of these monomers with other monomers directly react with metallic magnesium to provide polymeric Grignard reagents.

Polymeric compounds capable of providing a polymeric Grignard reagent by reaction with a Grignard reagent of RMgX are, for example, polyvinyl alcohol; those obtained by hydrolysis of copolymers of vinyl acetate with styrene, methyl methacrylate or vinyl pyridine; and homopolymers of methyl methacrylate or methyl acrylate, and copolymers of these monomers with styrene or acrylic acid. Compounds capable of providing a polymeric Grignard reagent further include homopolymers of 2-hydroxyethyl methacrylate and 2-hydroxyethyl acrylate or copolymers of these monomers with other monomers, and homopolymers of, for example, methylvinyl ketone and isopropyl vinyl ketone or copolymers of these monomers with, for example, styrene and acrylic acid.

Where the above-mentioned compounds are directly reacted with magnesium to prepare a polymeric Grignard reagent, then reaction proceeds according to the formula below:

(A)

where R is the residual group of a polymer, and X is a halogen. Namely, where the same moles of metallic magnesium and RX are dissolved or dispersed in anhydrous tetrahydrofuran with vigorous agitation, then reaction immediately takes place and is at room temperature completed in several hours.

Where said polymeric Grignard reagent is indirectly prepared, reaction proceeds, for example, according to the following formula:

where R' is an alkyl group, X is a halogen, and one or both of $R_1$ and $R_2$ are the residual groups of polymers, and when only one of said $R_1$ and $R_2$ is the residual group of a polymer, the other is an alkyl group.

Namely, a tetrahydrofuran solution containing $R_1COR_2$ is slowly added to another tetrahydrofuran solution containing the same moles of R'MgX as that of $R_1COR_2$ while being cooled with water, followed by gentle stirring. The mass is further stirred for several hours on a hot bath to complete the reaction.

The polymeric Grignard reagent thus obtained is reacted with the aforesaid monomeric metal complex at room temperature with stirring for several hours to form a polymeric metal complex according to this invention. The molar ratio between the polymeric Grignard reagent and the monomeric metal complex used is in the range of 1:1 to 100:1.

Where a monomeric metal complex whose central metal has a high valency is used in the aforesaid reactions (A) and (B), it is necessary to reduce said central metal to a low valency state in order to render the resultant polymeric metal complex capable of reversibly adsorbing oxygen to itself and desorbing oxygen therefrom. This reduction may be carried out before, after or simultaneously with the reaction (A) or (B), using a proper reducing agent or macroelectrolysis utilizing an electrochemical reaction.

The reducing agent used in the reaction (A) or (B) may be of inorganic or organic type. The typical reducing agents include sodium hydrosulfite ($Na_2S_2O_4$), ascorbic acid, hydrazine, hydroquinone and nicotinamide adenine dinucleotide (NAD). However, said reducing agents are not obviously limited to this group. For example, a redox system consisting of a reducing agent combined with an organic or inorganic oxidizing agent sometimes proves effective. This redox system includes combinations of peroxides such as hydrogen peroxide, benzoyl peroxide, and cumene hydroperoxide on one hand, and iron (II), chromium ion, sulfites, hydroxylamine and hydrazine on the other.

The reducing agent is chosen to be charged in an equimolar amount to the central metal of the metal complex or 1000-fold or preferably about 80 to 120-fold larger molar amount than said central metal, with about 100-fold larger molar amount being most preferred. The reducing reaction is completed in a solution at room temperature in 10 to 60 minutes.

Reduction by a reducing agent causes a large excess of reducing agent to remain in the system after completion of reaction. Therefore, these remnants are removed from a polymeric metal complex for purification. Monomeric metal complex not bound to the polymeric ligand, reducing agent and, if necessary, foreign ions can be eliminated by, for example, dialysis or the column process, and the solvent can be taken away by the freeze-drying process.

The columns used in the column process include those marketed by Pharmacia Co. of Sweden under a trade mark "Sephadex" packed with a filler of dextran cross linked by glycidyl alcohol (e.g., sold under a trade mark "Sephadex G-15" for removing remnants having a smaller molecular weight than 1000) and generally available silica gel. A monomeric metal complex whose central metal is originally in a low valency state needs no reduction. In such case, however, the reaction (A) or (B) is carried out in an inert gas atmosphere to prevent the central metal from being oxidized into higher valency.

The progress of the reactions (A) and (B) and the reduction is accurately recognized by tracing changes with time in the visible spectrum of a reaction solution.

Most preferred among the polymeric metal complexes thus prepared is the type in which the monomeric metal complex consists of Fe(II)-porphyrin or Co(II)-porphyrin, and the polymeric ligand is formed of a copolymer of 4-vinyl pyridine with N-vinyl pyrrolidone or 5-vinyl imidazole with N-vinyl pyrrolidone.

Detailed description will be later given of the capacity of a polymeric metal complex according to this invention reversibly to adsorb oxygen to itself (the complex takes an oxygenated form) and desorb oxygen therefrom (oxygen is liberated from the oxygenated complex).

The present inventors have further discovered that where the above-mentioned polymeric metal complex (form I) is reacted with a secondary component (additive) consisting of one or more kinds of polymeric or monomeric compounds admitting of interaction with said polymeric metal complex (form I), then it is possible to produce another type of polymeric metal complex (form II) which, when adsorbing oxygen to itself, is changed into a more stable oxygenated complex without causing the central metal to be irreversibly oxidized.

As used herein, the compounds admitting of interaction with the polymeric metal complex (form I) include polymeric compounds capable of ionic-bonding (ion) and hydrogen-bonding with said polymeric metal complex (form I) or acting as an electron donor or acceptor with respect to said complex (form I) and monomeric compounds capable of locally forming a hydrophobic cavity by changing the conformation of a polymer chain of said complex (form I) in solution.

Concrete examples of the polymeric and monomeric secondary components are:

(i) The ionic bonding type of polymeric compounds (polyions) include polyanions such as polyacrylic acid, polymethacrylic acid, polyitaconic acid, polyglutamic acid, pectic acid and alginic acid. However, said polyions are not limited to this group. For example, where the polymeric metal complex (form I) consists of a chain containing many anionic dissociation groups, then polycations naturally constitute the counterparts of said polyanions.

(ii) The hydrogen-bonding type of polymeric compounds include polymeric compounds containing functional groups admitting of hydrogen-bonding such as amino group, aromatic ring containing a nitrogen atom as a constituent of the ring, amide group, carbonyl group, carboxyl group, hydroxyethyl group, formyl group, hydroxyl group and ether group, for example, homopolymers or copolymers of vinylpyridine, vinylimidazole and N-vinylpyrrolidone, polymers containing nucleic acid base (for example, polyethylene imine and polyvinyl pyridine both quaternized by 9-(2'-chloroethyl)adenine), polymethacrylic acid, polyitaconic acid, pectic acid, alginic acid, polyvinyl alcohol, polyethylene glycol, homopolymers of acrylic esters such as methyl methacrylate and methyl acrylate or derivatives of vinyl ketones such as methylvinyl ketone, copolymers of these monomers with comonomers such as styrene and vinyl pyridine, homopolymers of 2-hydroxyethyl methacrylate and 2-hydroxyethyl acrylate, copolymers of these monomers with other monomers, homopolymers of acrolein and methacrolein, and copolymers of these monomers with other monomers.

(iii) The polymeric compounds acting as electron donors or acceptors include electron donor polymers such as homopolymers of, for example, vinylpyridine and vinylimidazole and copolymers of these monomers with, for example, styrene derivatives, vinylcarbazole, vinylnaphthalene, and vinylpyrene; and electron acceptor polymers such as copolymers of vinyl monomers containing a heterocyclic aromatic base, for example, vinylpyridine and vinylimidazole with electron acceptor monomers such as acrylonitrile, fumaronitrile and maleic ahydride. The term "polymeric compounds" is used in the sense already defined.

(iv) Monomeric compounds capable of locally forming a hydrophobic cavity by changing the conformation of a polymer chain of the polymeric metal complex (form I) in solution include surface active agents such as sodium lauryl sulfate and cetyl trimethyl ammonium chloride and neutral salts such as sodium chloride, sodium bromide and sodium perchlorate.

The second polymeric composite metal complex (form II) obtained by reacting the polymeric metal complex (form I) with a compound admitting of interaction therewith causes the central metal of a monomeric metal complex surrounded by a domain consisting of a polymeric substance to be little irreversibly oxidized, thus providing a more stable oxygenated metal complex when oxygen is adsorbed to said second polymeric composite metal complex (form II).

The second polymeric composite metal complex (form II) is prepared by mixing a solution of the polymeric metal complex (form I) with a solution of the compound admitting of interaction therewith generally at room temperature, and, as occasion demands, at a lower or higher level than room temperature. Where the secondary component or adduct is a polymeric compound, it is advised to charge said adduct in a reactor in a molar amount equal to or slightly larger than that of a functional group taking part in the interaction. Where said secondary component or adduct is a surface active agent, it is preferred to charge a larger amount of said adduct than the critical micelle concentration (CMC). And said secondary component, if formed of a neutral salt, should advisably be charged roughly in the concentration of 0.1 to 0.5 mol/l. Reaction time varies with the intensity of the interacting force between the reactants. For instance, reaction between ion complexes is immediately completed, whereas the completion of reaction takes several days or even a longer time where a polymeric mass is to be formed by hydrophobic bonding. Most preferred among the secondary polymeric composite complexes (form II) thus prepared are those given in Table A below.

Table A

| Monomeric metal complex | Polymeric ligand | Secondary component |
|---|---|---|
| Fe(II)-porphyrin Co(II)-porphyrin | Partially-quaternized polyvinyl pyridine | Sodium polystyrene sulfate |
| | Partially-quarternized polyvinyl imidazole | |
| | 4-vinylpyridine-N-vinylpyrrolidone copolymer | Polymethacrylic acid |
| | 5-vinylimidazole-N-vinylpyrrolidone copolymer | |

The second polymeric composite metal complex (form II) prepared by reacting the polymeric metal complex (form I) with any or combination of polymeric compounds capable of interaction therewith previously described under Items (i), (ii) and (iii), has an intricate multichain structure, wherein the monomeric metal complex is deeply buried in the local field of the hydrophobic cavity formed by a polymer chain. Therefore, the central metal of the monomeric metal complex is saved from deactivation by irreversible oxidation even in a solvent of high polarity such as water, at room temperature and atmospheric pressure, thereby attaining the very efficient adsorption and desorption of oxygen.

With the composite metal complex (form II) surrounded by a micelle consisting of a surface active agent, the monomeric metal complex is positioned in the hydrophobic cavity of spherical or stratified micelles, also saving its central metal from irreversible oxidation. A composite metal complex (form II) in which the aforesaid neutral salts are bonded together displays the same effect. However, with a composite metal complex (form II) prepared by adding a surface active agent or neutral salt, the irreversible oxidation of the central metal of the monomeric metal complex is far less prevented than in that type of composite metal complex (form II) which is obtained by incorporation of a polymeric additive.

The previously described reduction applied in making the polymeric metal complex (form I) may be effected in the same manner as in the preceding case simultaneously with or after reaction between said metal complex (form I) and a compound capable of interaction therewith.

The polymeric metal complex of this invention has the following outstanding properties.

(1) The subject complex can reversibly adsorb oxygen to itself and desorb oxygen therefrom, whether said complex is in a solid state or in a solution. Where brought into contact with oxygen in a solid state or in a solution of an organic solvent or a 1 to 5 wt% aqueous solution of NaCl, a ligand occupying on of the axial coordination sites is replaced by oxygen, which in turn is bound as an axial ligand to provide an oxygenated metal complex. Where the oxygenated metal complex is allowed to stand in the inert gas atmosphere consisting of, for example, nitrogen or in vacuum, then the coordinated molecular oxygen is desorbed to restore said complex to the original condition.

Particularly that type of polymeric metal complex which contains the secondary component can attain the reversible adsorption and desorption of oxygen not only in the conditions in which the prior art monomeric metal complex is applied, namely, at low temperature, at high to atmospheric pressure and in a dry state, but also at room temperature and in a state dissolved in a solvent of high polarity such as water.

(2) The subject polymeric metal complex can save the central metal of the monomeric metal complex from deactivation by irreversible oxidation during adsorption and desorption of oxygen as is unavoidably the case with the prior art monomeric metal complex, and consequently is adapted to be repeatedly used many times for adsorption and desorption of oxygen.

(3) With the subject polymeric metal complex, the central metal is included in the hydrophobic cavity of the polymer chain. where, therefore, said metal complex adsorbs oxygen to itself, the resultant oxygenated form remains stable over a very long period of time.

(4) The subject polymeric metal complex can adsorb oxygen in a larger amount and more quickly than the prior art monomeric metal complex.

The above listed outstanding properties of the polymeric metal complex of this invention can be recognized by measurement of a visible spectrum, or volumetric analysis using a Warburg pressure gauge, where said metal complex is in a solution, and by a magnetic scale or measurement of electron spin resonance, where said metal complex is in a solid state.

The polymeric metal complex of this invention attaining the reversible adsorption and desorption of oxygen is applicable to an oxygen fixation catalyst for capturing oxygen from the air, oxygen carrier admitting of the easy supply of activated oxygen, photoconductive polymer, semiconductor polymer, photosensitive film, paramagnetic film. Further, the subject polymeric metal complex has wide chemical applications as an oxygen carrier and is also expected to be used as an important raw material for artificial red blood corpuscles.

This invention will be more fully understood with reference to the examples which follow.

EXAMPLE 1

A solution prepared by dissolving 0.13g of chlorohemin represented by the formula (1) below in 90 ml of DMF was mixed with a solution prepared by dissolving 2.8g of sodium hydrosulfite in 10 ml of water, the resultant reduction being completed in 25 to 30 minutes at room temperature in an atmosphere of nitrogen gas.

The mixed solution was added to a solution prepared by dissolving 10.5g of polyvinylpyridine degree of (polymerization: 49) in 500 ml of methanol. The mass was fully stirred about 10 minutes at room temperature (25° to 30° C), and thereafter dialyzed in a mixed solvent consisting of 500 ml of methanol and 100 ml of DMF in an atmosphere of nitrogen gas. After removal of the reducing agent contained, the solvent was distilled out, providing 9.9g of polymeric metal complex (polymeric pyridine-heme complex). Throughout the above-mentioned process, reaction was carried out in an atmosphere of nitrogen gas with the oxygen contained in the solvent expelled by bubbling nitrogen streams.

Figure 1:
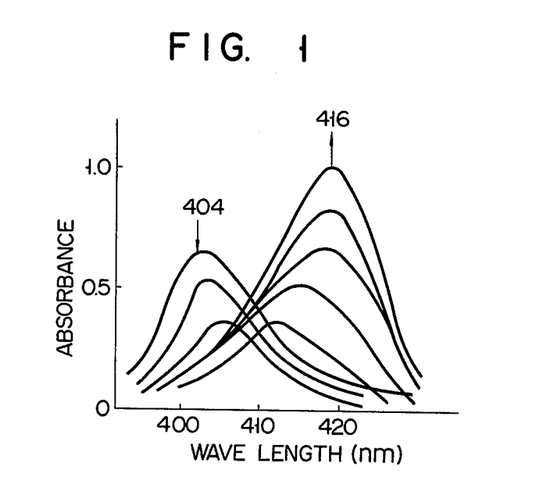
FIG. 1 is a curve diagram showing spectral changes occurring in the reduction of chlorohemin alone.

Reduction of chlorohemin alone presented a light absorption spectrum of FIG. 1. Namely, absorption of light having a wave length of 404 nm by the oxidized heme gradually decreased with the progress of reduction and an absorption maximum was shifted toward the longer wave region, until the reduced-type heme complex represented an absorption maximum at 416 nm.

In contrast, a polymeric metal complex obtained in Example 1 which was a polymeric pyridine-heme complex presented an absorption band characteristic of reduced pyridine-hemochrome at 418 nm.

The foregoing description refers to the results of the experiment where a polymeric ligand consisted of polyvinylpyridine. However, polyvinylimidazole, poly-L-lysine, partially-quaternized polyvinylpyridine used as a polymeric ligand also allowed an experiment to be carried out by the same process, all the experimental results being set forth in Table 1 below.

Table 1

| Soret Band of Polymeric Heme Complex | | | | |
|---|---|---|---|---|
| Polymeric ligand (average molecular weight) | Solvent (for reaction and spectral analysis) | Absorption maximum in the Soret band (nm) | | |
| | | Oxidized type | Reduced type | Oxygenated type |
| Polyvinylpyridine (5,000) | Methanol/DMF (volumetric ratio of 5:1) containing a few percent of $H_2O$ | 424 | 418 | 402 |
| Polyvinylimidazole (6,000) | " | 410 | 418 | 402 |
| Poly-L-Lysine (10,000) | " | 425 | 433 | 402 |
| Partially-quaternized polyvinylpyridine (7,500) | 3% saline aqueous solution (volumetric ratio of 9:1) | 397 | 422 | 406 |

Note 1:
Reduction was conducted under the following conditions:
$2 \times 10^{-3}$ mol/l of chlorohemin
$1.6 \times 10^{-1}$ mol/l of sodium hydrosulfite
90 ml of DMF/10 ml of $H_2O$
room temperature
25 to 30 minutes

Note 2:
Concentration of a polymeric ligand was 0.2 mol/l (methanol)

EXAMPLE 2

A solution prepared by dissolving 0.13g of chlorohemin in 90 ml of DMF was mixed with a solution prepared by dissolving 2.8g of sodium hydrosulfite in 10 ml of water. The chlorohemin was reduced in 25 to 30 minutes at room temperature in an atmosphere of nitrogen gas. The mixed solution was added to a solution prepared by dissolving in 500 ml of DMF 25g of poly-ε-N-carbobenzoxy-L-lysine (degree of polymerization: 10) containing histamin at the end of a polymer chain. After fully stirred about 10 minutes at room temperature, the mass was dialyzed and the solvent contained was removed, providing 24g of reduced-type polymeric lysine-heme complex. The product displayed such a visible absorption spectrum that an absorption band characteristic of imidazole hemochrome appeared at 418 nm.

EXAMPLE 3

A solution prepared by dissolving 0.65g of tris[3-(2-pyrrolylmethyleneimino) propene-1-ato] Co(III) (Co(PIP)₃) represented by formula (2)

in 90 ml of methanol was mixed with a solution prepared by dissolving 3.6g of sodium hydrosulfite in 10 ml of water, the reduction being completed in 25 to 30 minutes at room temperature in an atmosphere of nitrogen gas. The mixed solution was added to a solution prepared by dissolving 10.5 of polyvinylpyridine degree of polymerization: 49) in 500 ml of methanol. After fully stirred about 10 minutes at room temperature, the mass was dialyzed in methanol in an atmosphere of nitrogen gas to distil out the solvent contained, providing 10g of polymeric pyridine-pyrrole Schiff base metal complex having a central metal of Co(II). Further experiments were carried out with other monomeric metal complexes than Co(PIP)₃ in the same manner as described above with a polymeric ligand changed each time, the yields (in grams) of polymeric metal complex produced being presented in Table 2 below.

Table 2

| Synthesis of polymeric metal complexes (form I) | | | |
|---|---|---|---|
| | Polymeric ligand (molecular weight) | | |
| Raw metal complex | Polyvinylpyridine (5,000) | Polyvinylimidazole (6,000) | Poly-L-Lysine (10,000) |
| Trans Na[Co(DMG)₂Cl₂] | 9.8 | 9.0 | 14.8 |
| Trans Na[Co(acac)₂(NO₂)₂] | 11.3 | 9.7 | 15.5 |
| Trans[Co(baen)(H₂O)₂]ClO₄ | 10.2 | 9.3 | 15.0 |
| Ni-dimethylglyoxime | 9.5 | 8.8 | 14.2 |
| Mn-phthalocyanine | 10.7 | 9.2 | 15.3 |
| Cr-(DMG)₂Cl₂ | 9.3 | 8.6 | 13.9 |

EXAMPLE 4

A solution prepared by dissolving 5g of a copolymer of p-chloromethyl styrene with N-vinylpyrrolidone in the molar ratio of 3:7 in 500 ml of tetrahydrofuran (THF) was added with a metallic magnesium piece weighing 1.5g and 0.1g of iodine. The mass was stirred at 50° C. When the magnesium piece was fully dissolved, the mass was cooled to 15° to 25° C and vigorously stirred for a few hours with addition of 0.5g of chlorohemin. The reaction solution was then poured in ethyl acetate, providing 4.5g of precipitates. The polymeric metal complex thus obtained was reduced using $Na_2S_2O_4$ in a mixed solvent of THF-water to a low valency state capable of carrying out the adsorption and desorption of oxygen.

EXAMPLE 5

500 ml of an aqueous solution containing 16.7g of polyvinylpyridine partially quaternized by benzyl chloride, (degree of polymerization: 98 and degree of quaternization 50%) and 90 ml of DMF containing 0.13g of chlorohemin were mixed together. 10g of sodium chloride was dissolved in the mixed solution, with further addition of 10 ml of an aqueous solution containing 2.8g of sodium hydrosulfite. The whole mass was stirred for 10 minutes in an atmosphere of nitrogen gas. 500 ml of an aqueous solution of 0.1N sodium hydroxide containing 8.6g of polymethacrylic acid having a molecular weight of 120,000 was added to the above solution to provide a precipitated product. When centrifugally collected, the precipitated product was measured to have a yield of 20.2g. The product was found to be a polyion complex containing embedded heme. The precipitated product was dissolved in a mixed solvent of water and acetone dissolving NaBr. The solution was poured on mercury contained in an evaporation dish in a thin layer, followed by slowly volatilizing out the remaining solvent in a desiccator under vacuum, providing a thin film.

Further experiments were made with the case where a cationic polymeric ligand consisted of partially-quaternized polyvinylimidazole, and also where an anionic polymeric electrolyte consisted of other polycarboxylic acids than polymethacrylic acid, the yields (in grams) of polymeric metal complexes obtained being also given in Table 3 below.

Table 3
Synthesis of polymeric Heme Complex (form II)

| Cationic polymeric ligand (molecular weight) | Polycarboxylic acid (molecular weight) | | | |
|---|---|---|---|---|
| | Polymethacrylic acid (120,000) | Polyacrylic acid (100,000) | Polyglutamic acid (50,000) | Pectic acid (70,000) |
| Partially-quaternized polyvinylpyridine* (7,500) | 20.2 | 19.1 | 23.7 | 27.4 |
| Partially-quaternized polyvinylimidazole* (9,000) | 19.5 | 18.4 | 23.0 | 26.7 |

*Degree of quaternization : 50%
Quaternizing agent : benzyl chloride

EXAMPLE 6

500 ml of an aqueous solution containing a copolymer of 4-vinylpyridine with N-vinylpyrrolidone in the molar ratio of 0.2:0.8 was mixed with 90 ml of DMF containing 0.13g of chlorohemin, with further addition of 2.8g of sodium hydrosulfite, the resultant reduction being completed in 10 minutes in an atmosphere of nitrogen gas. The mass thus treated was mixed with 500 ml of an aqueous solution containing 17.2g of polymethacrylic acid, providing a precipitated product. When centrifugally collected and dried in vacuum, the precipitated product was measured to have a yield of 50g. Later, the product was made into a film in the same manner as in Example 5.

EXAMPLE 7

10 ml of an aqueous solution containing 0.57g of ferrous sulfate was slowly dripped at room temperature into a solution prepared by dissolving 0.21g of protoporphyrin IX having the formula:

in 50 ml of N, N-dimethyl formamide, followed by full stirring. The mass was mixed with 200 ml of an aqueous solution containing 5.0g of partially-quaternized polyvinylpyridine (degree of polymerization 98 and quaternization 23%; quaternizing agent: benzyl chloride), also followed by full stirring. When the mixed mass was poured in 1500 ml of dioxane, 4.85g of a desired polymeric pyridine hemochrome was crystallized out. Throughout the experiment, the oxygen contained in the solvent was expelled by bubbling nitrogen streams, and reaction was carried out in an atmosphere of nitrogen gas.

EXAMPLE 8

16 ml of an aqueous solution containing 0.4g of cobalt chloride $(CoCl_2)$ was slowly dripped into a solution prepared by dissolving 0.10g of 3-(2-pyrrolylmethyleneimino)propene-1 represented by the formula (4) below in 20 ml of methanol, followed by full stirring about 10 minutes. The mixed solution was added to 200 ml of an aqueous solution containing 5.0g of partially-quaternized polyvinylpyridine (degree of polymerization 98 and degree of quaternization 23%; quaternizing agent: benzyl chloride). When the mass was poured in 1500 ml of dioxane, 4.73g of a desired polymeric metal complex was precipitated. Throughout the experiment, the oxygen contained in the solvent was expelled by bubbling nitrogen streams and reaction was conducted in an atmosphere of nitrogen gas.

Examples 7 and 8 relate to the cases where the polymeric ligand consisted of partially-quaternized polyvinylpyridine. Further experiments were made under the same conditions as in Examples 7 and 8 with the cases where other water-soluble polymeric compounds consisted of partially-quaternized polyvinylimidazole (degree of polymerization 50 and degree of quaternization 20%; quaternizing agent: benzyl chloride), copolymer of 4-vinylpyridine with N-vinylpyrrolidone in the molar ratio of 0.3:0.7, poly-L-lysine hydrochloride (degree of polymerization 100) and polyethyleneimine ($\overline{M}w$ = 30,000; content of primary amino group 40 mol %), with a monomeric metal complex also changed, the results of all these experiments being set forth in Table 4 below.

Table 4
Synthesis of water-soluble polymeric metal complexes (form I)

| Monomeric metal complex | Polymeric ligrand (molecular weight) Partially-quaternized polyvinylpyridine (7,500) | Partially-quaternized polyvinylimidazole (9,000) | Copolymer of 4-vinyl-pyridine and N-vinyl-pyrrolidone (5,000) | Poly-L-lysine hydrochloride (5,000) | Polyethyleneimine (30,000) |
|---|---|---|---|---|---|
| Fe(II)-porphyrin | 4.85 | 5.50 | 10.1 | 2.90 | 2.32 |
| Co(II)-dimethyl glyoxime | 4.80 | 5.12 | 11.2 | 2.75 | 2.23 |
| Co(II)-acetylacetone | 4.90 | 5.47 | 11.5 | 2.60 | 2.18 |
| Ni(II)-dimethyl glyoxime | 4.72 | 5.05 | 10.7 | 2.80 | 2.25 |
| Mn(II)-phthalocyanine | 6.85 | 6.90 | 13.6 | 4.35 | 2.40 |

Note: A monomeric metal complex was used in $3.8 \times 10^{-4}$ moles and a polymeric ligand was used in $3.8 \times 10^{-2}$ moles.

EXAMPLE 9

Reduced-type polymeric pyridine hemochrome prepared in Example 1 was dissolved in a mixed solvent consisting of methanol and DMF in the volumetric ratio of 7:3, providing a solution of $1.0 \times 10^{-5}$ mol/l as measured on the basis of the concentration of heme.

Figure 2:
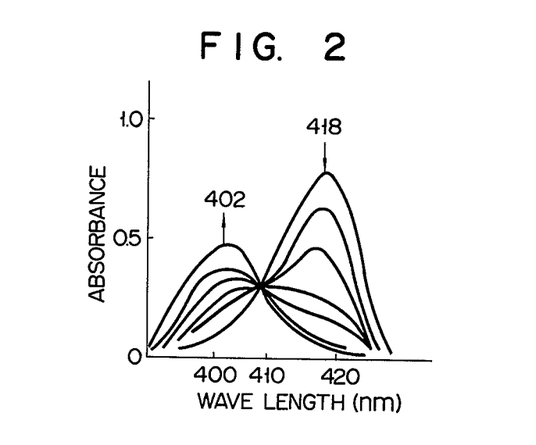
FIG. 2 is a curve diagram presenting spectral changes occurring in the oxygenation of a reduced-type polymeric pyridine hemochrome according to this invention.

Oxygen was introduced into the solution until it was saturated. A spectrum was prepared with respect to absorption in the visible region. As seen from FIG. 2, a new absorption band appeared at 402 nm. Where nitrogen gas was brought into the solution, the absorption was reversed from 402 nm to the original 418 nm. The same results were obtained with a solution having an absorption maximum at 418 nm even when said solution was frozen and deaerated. This proves that the absorption band at 402 nm is due to an oxygenated metal complex in which molecular oxygen was bonded to the axial coordination site of heme. Experiments conducted in the same manner with reduced-type polymeric imidazole hemochromogen confirmed the growth of an oxygenated heme complex. Further, determination was made of the amount of oxygen adsorbed and the rate of said adsorption by gas volume analysis using a Warburg pressure gauge, proving that the polymeric heme complex was far more active in oxygenation than the corresponding monomeric heme complex as apparent from Table 5 below.

Table 5
Rate Constants of Oxygenation and Degrees of Oxygen-Saturation for Pyridine and Imidazole Hemochromes

| Axial ligand | Rate constant of oxygenation $[k \times 10^4 \, (\text{sec}^{-1})]$ | Degree of oxygen-saturation (%) |
|---|---|---|
| Pyridine | 0.99 | 60 |
| Polyvinylpyridine (Mw = 5,000) | 1.86 | 91 |
| Imidazole | 4.78 | 63 |
| Polyvinylimidazole (Mw = 6,000) | 7.76 | 93 |

EXAMPLE 10

When a film prepared in Example 5 was placed in a stream of nitrogen gas at room temperature, a typical absorption band of reduced-type pyridine hemochrome appeared in the visible region. When the film was exposed to oxygen or air, oxygen was slowly adsorbed to the film, giving rise to an absorption band characteristics of the oxygenated heme complex. This oxygenation phenomenon reversibly appeared. Namely, when the film was again placed in a stream of inert gas or heated, the film indicated the original absorption band of the reduced-type pyridine hemochrome. This cycle of adsorption and desorption of oxygen could be repeated many times. The same phenomenon was also observed in a film prepared from other polymer complex in which heme was embedded.

EXAMPLE 11

Figure 3:
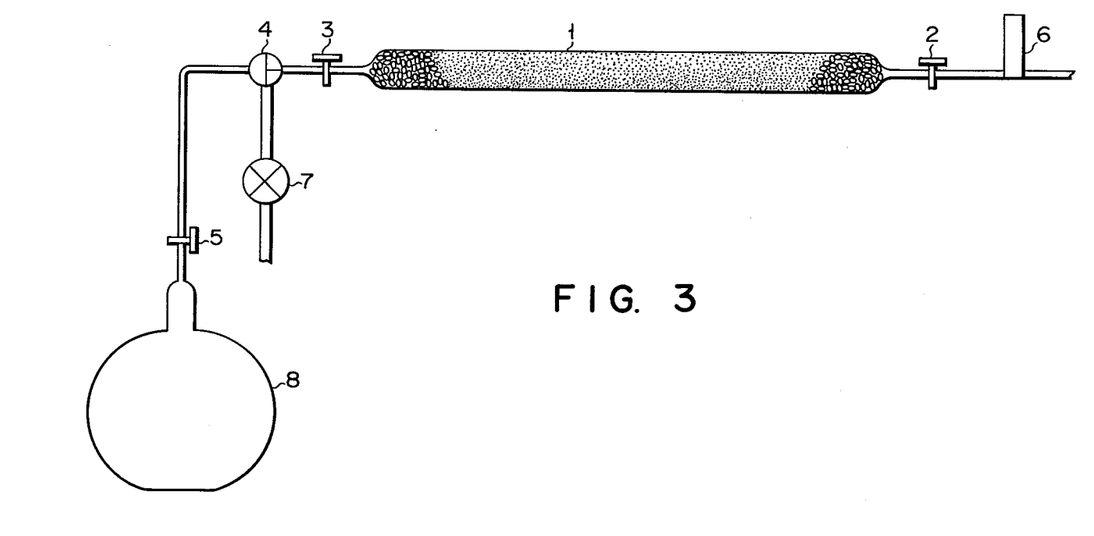
FIG. 3 is a sectional view of an oxygen fixation device used in the example of this invention.

A glass tube 10 mm in inner diameter and 100 cm long was filled, as shown in FIG. 3, with 500g of powders of polymeric metal complex prepared in Example 5 which had a particle size of about 1 mm. This charged mass was a heme complex embedded in a polyion complex consisting of partially-quaternized polyvinylpyridine quaternized by benzyl chloride and polymethacrylic acid. Thereafter an oxygen fixation device was assembled. Referring to FIG. 3, referential numerals 2, 3, 4 and 5 denote cocks, 6 a flow meter, 7 a pump and 8 a 1000 ml evacuated jar for collecting oxygen. The pump 7 was operated with the cocks 2, 3 opened, the cock 5 closed and the cock 4 opened to the pump 7. Air was allowed to pass for one hour through the glass tube 1 at the flow rate of 1 cc/min. Thereafter, the cocks 2, 3 were closed, the cock 4 was opened to the evacuated jar 8, and the cock 5 was opened. Then oxygen adsorbed to the powders of the heme complex filled in the glass tube 1 was desorbed and flowed into the evacuated jar 8. An amount of oxygen collected by this process was about 80 cc. Further experiments were carried out with other polymeric metal complexes than the above-mentioned polyion complex, the results being indicated in Table 6.

Table 6
Adsorption of oxygen to polymeric heme complex

| Polycation (Mw) | Polyanion (Mw) Polymethacrylic acid (120,000) | Polyacrylic acid (100,000) | Polyglutamic acid (50,000) | Pectic acid (70,000) |
|---|---|---|---|---|
| QPVP (7,500) | 77.6 | 82.2 | 66.2 | 57.2 |
| QPVI (9,000) | 80.4 | 85.1 | 68.2 | 58.8 |

Note 1:
Numerical values denote amounts (cc) of oxygen collected by a single operation conducted in Example 11.
Note 2:
QPVP = polyvinylpyridine partially-quaternized (50%) by benzyl chloride
QPVI = polyvinylimidazole partially-quaternized (50%) by benzyl chloride

EXAMPLE 12

Determination was made in water of interaction between polymeric pyridine hemochrome prepared in accordance with the process of Example 7 and oxygen and at room temperature and atmospheric pressure. There was used a mixed solvent consisting of water and DMF in the volumetric ratio of 9:1 in whch partially-quaternized polyvinylpyridine (degree of polymerization 98 and degree of quaternization 23%; quaternizing agent: benzyl chloride) had its concentration controlled to $1.3 \times 10^{-3}$ mol/l based on pyridine and the heme complex had its concentration controlled to $1.0 \times 10^{-5}$ mol/l.

This mixed solvent was further mixed with water saturated with oxygen. Immediately, changes with time in a Soret region were traced by a rapid scanning spectrophotometer, resulting in that the absorption band at 422 nm due to the reduced-type pyridine hemochrome gradually decreased, whereas the absorption band due to the oxygenated complex gradually increased through the isosbestic point toward 406 nm. Adsorption of oxygen by the heme in the solvent quickly advanced and was completed in about 0.5 second.

Figure 4:
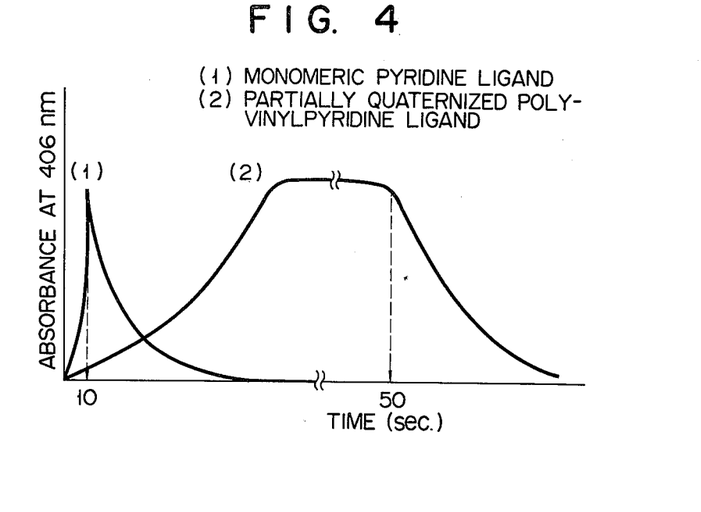
FIG. 4 is a curve diagram of changes with time in the visible Soret band at 406 nm assigned to oxygenated complex as measured in an aqueous solution by a stopped flow method with respect to the oxygenation process of polymeric metal complex according to the invention and monomeric metal complex.

When measurement was made in an aqueous solution by a stopped flow method of the period in which the absorption band at 406 nm due to the oxygenated complex remained stable, then said period of stabilization varied with time as shown in FIG. 4. Namely, where monomeric pyridine was bonded with an axial liqand without using a polymeric ligand, then absorption band at 406 nm began to decay in less than 1 second (Curve (1)). In contrast, where partially-quaternized polyvinylpyridine was used in an aqueous solution with the ionic strength controlled to 0.1, then an absorption band at 406 nm remained stable for about 50 seconds (Curve (2)). Further where polymethacrylic acid capable of electrostatic interaction with partially quaterrized polyvinylpyridine was further added, then an absorption band at 406 nm remained very stable even as long as about 50 minutes. Even where surface active agent of sodium laurylsulfate was applied in place of a polymeric ligand in a larger amount than the cirtical micelle concentration, then a light absorption band at 402 nm remained stable for a period of about 30 seconds.

The same results as described above were also obtained from the experiments were there were used polymeric heme complexes prepared by reacting protoheme with a polymeric ligand such as partially-quaternized polyvinylimidazole, copolymer of 4-vinylpyridine with N-vinylpyrrolidone, copolymer of 5-vinylimidazole with N-vinylpyrrolidone, poly-L-lysine hydrochloride and polyethyleneimine and also by reacting protoheme with a polymeric Grignard reagent derived from a copolymer of p-chloromethyl styrene with N-vinylpyrrolidone, with compounds capable of interaction with a polymeric ligand suitably changed. The results of all the above-mentioned experiments are shown in Table 7 below.

Table 7

Stability of Oxygenated Polymeric Heme Complexes

| Second component | Partially-quaternized polyvinyl-pyridine (7,500) | Partially-quaternized polyvinyl-imidazole (9,000) | Copolymer of 4-vinyl-pyridine and-N-vinyl-pyrrolidone (5,000) | Copolymer of 5-vinyl-imidazole and -N-vinyl-pyrrolidone (5,500) | Poly-L-lysine hydro-chloride (10,000) | Poly-ethylene-imine (30,000) | Copolymer of p-chloro-methyl styrene and N-vinyl-pyrrolidone (5,500) |
|---|---|---|---|---|---|---|---|
| NaCl | 50 | 30 | — | — | 10 | — | — |
| Polymethacrylic acid (Mw : 120,000) | 3000 | 1800 | $60 \times 10^4$ | $8 \times 10^4$ | — | 2000 | 500 |
| Polystyrene sulfonic acid (Mw : 100,000) | 9000 | 6000 | — | — | — | — | — |
| Polyglutamic acid (Mw : 50,000) | — | — | — | — | 2000 | 1500 | 300 |

Note: The numerical values given in the Table denote the periods (expressed in seconds) in which an absorption band at 406 nm was sustained.

EXAMPLE 13

In Example 12, the oxygenated polymeric metal complexes prepared by changing the kinds of polymeric ligand additive and the combinations thereof presented different degrees of stability. The cause was studied from analysis of each of elementary reactions associated with interaction between central metal and oxygen.

There will now be described the case where the monomeric metal complex consisted of heme and the polymeric ligand was formed of partially-quaternized polyvinylpyridine. There was provided a mixed solvent consisting of water and DMF in the volumetric ratio of 9:1, in which the partially-quaternized polyvinylpyridine (degree of polymerization 98 degree of quaternization 23%; quaternizing agent: benzyl chloride) had its concentration controlled to $1.3 \times 10^{-3}$ mol/l based on pyridine and the heme had its concentration controlled to $1.0 \times 10^{-5}$ mol/l. Said solvent was mixed with an aqueous solution of polymethacrylic acid (degree of polymerization 200) at various concentrations, thereby providing a plurality of solutions in which the cation and anion regions had different molar ratios.

Determination was made of changes with time (as in FIG. 4) in the absorption band at 406 nm occurring in the respective solutions thus prepared when brought into contact with oxygen.

Figure 5:
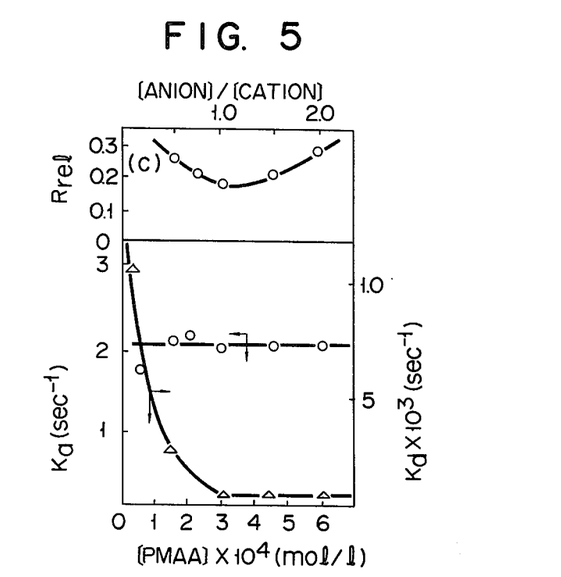
FIGS. 5, 6 and 7 set forth the effect of the additives on the kinetics of each elementary process in oxygenation and oxidation of the polymeric metal complex of the invention.

The constant $k_a$ of the oxygenation rate and the constant $k_d$ of the oxidation rate were determined from the first order plotting of the increase in absorbance at 406 nm in the initial portion of curve (2) and the decrease in absorbance at 406 nm in the final of curve (2), respectively, the results being set forth in FIG. 5. Namely, $k_a$ is the rate constant of oxygenation and $k_d$ the rate constant of irreversible oxidation (see the following equation).

The character $R_{rel}$ representing the upper half portion of FIG. 5 shows the ratio of the reduced viscosity of a mixed solution consisting of polymethacrylic acid and partially-quaternized polyvinylpyridine to a sum of the reduced viscosity of the polymethacrylic acid and that of the partially-quaternized polyvinylpyridine, and is represented by the formula:

$$R_{rel} = \frac{\eta_{sp}/C(QPVP + PMAA)}{\eta_{sp}/C(QPVP) + \eta_{sp}/C(PMAA)}$$

As apparent from FIG. 5, addition of polymethacrylic acid gives rise to electrostatic interaction between polymer chains, resulting in decreasing of viscosity of a complex system and the noticeable shrinkage of a polymer chain. As the result, heme is included in the hydrophobic cavity of a domain consisting of a series of polymer chains to suppress the discharge of an oxygenated complex (i.e. irreversible oxidation of the central metal). This causes $k_d$ to have a small value, that is, the oxygenated complex to remain stable over a long period. Oxygen which is a small molecule with non-charge is little affected by the conditions (hydrophobicity, steric factors, etc.) of a system consisting of a polymer and heme included therein. Further, since oxygenation reaction takes place between non-charged materials (heme and $O_2$ are formally non-charged materials), $k_a$ has a substantially constant value.

EXAMPLE 14

Even where a surface active agent is used in Example 13 in place of a polymeric ligand, it is possible to expect the effect of placing the central metal of the polymeric complex similarly in the hydrophobic cavity.

Figure 6:
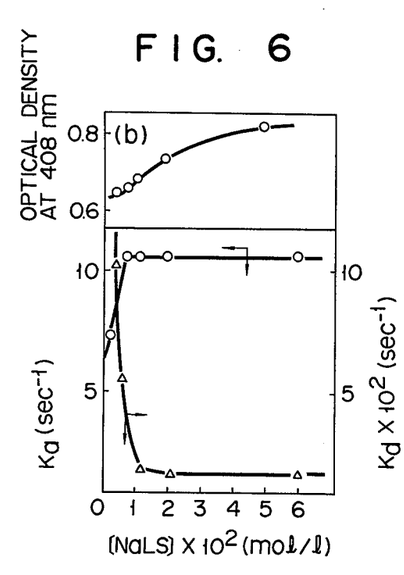
Figure 7:
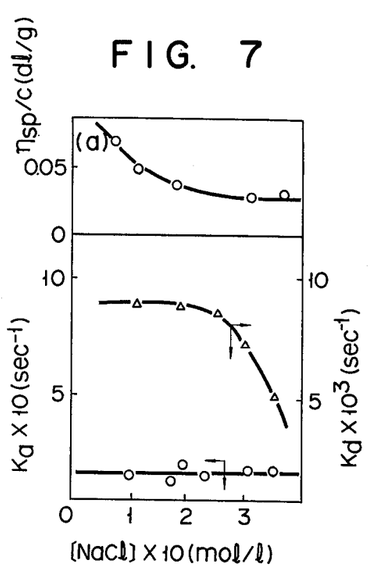

Experiments were carried out in the same manner as in Example 13 to determine the value of $k_a$ and $k_d$ with various solutions prepared by adding sodium laurylsulfate at different concentrations to a plurality of mixed solutions consisting of water and DMF in the molar ratio of 9:1 in which the heme had its concentration controlled to $1.0 \times 10^{-5}$ mol/l and pyridine had its concentration controlled to $1.0 \times 10^{-2}$ mol/l, the results being indicated in FIG. 6. Changes in absorption by pyridine hemichrome at 408 nm were also traced for different concentrations of sodium laurylsulfate, the results being set forth in the upper half portion of FIG. 6. The data proved that when used at a concentration approaching $8.0 \times 10^{-3}$ mol/l, the sodium laurylsulfate formed micelles and the heme was enveloped in the hydrophobic region of said micelles. Also the value of $k_d$ sharply decreased in the neighborhood of said concentration. This was supposed to originate with the fact that since the heme was enveloped in the hydrophobic region as in the previous case, static attraction of ion pairs between iron and oxygen increased with the resultant decrease in the value of $k_d$. Experiments were also made with the case where the sodium laurylsulfate was replaced by NaCl, the results being shown in FIG. 7.

EXAMPLE 15

Figure 8:
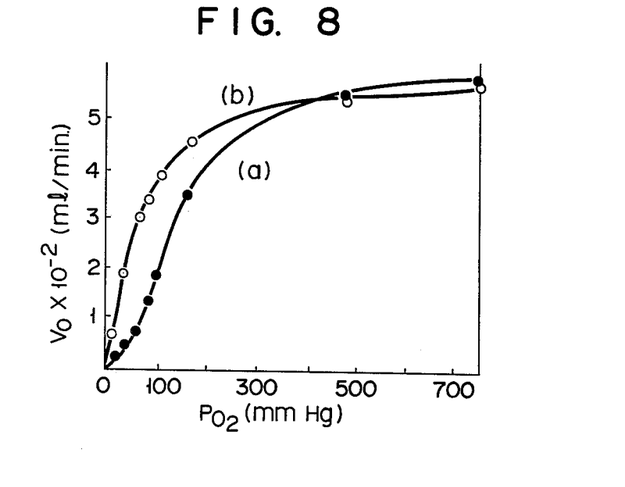
FIG. 8 is a curve diagram showing the dependence of the initial rate of oxygen-uptake on partial pressure of oxygen for the different forms of polymeric metal complex according to this invention.

Adsorption of oxygen was determined in a buffer solution (pH=12) of phosphoric acid at 30° C with respect to a poly-L-lysine-heme complex prepared by reacting 10,000 molecular weight poly-L-lysine at a concentration of $4.55 \times 10^{-2}$ mol/l with Fe(II)-porphyrin at a concentration of $6.00 \times 10^{-4}$ mol/l, also with respect to another form of complex prepared by reacting the above-mentioned poly-L-lysine-heme complex with 25,000 molecular weight polyethylene glycol at a concentration of $6.00 \times 10^{-2}$ mol/l used as a compound capable of interaction with said complex, the results being indicated by the curves of FIG. 8.

The oxygen adsorption curve associated with the poly-L-lysine-heme complex presents an S-shape as indicated by (a) of FIG. 9. In contrast, the oxygen adsorption curve relative to the polyethylene glycol-poly-L-lysine-heme complex shows a rectangular hyperbolic form (b), proving that the latter complex has a smaller allosteric effect in oxygen adsorption. A parameter n (Hill constant) representing the allosteric effect and variation $-\Delta F$ in free energy liberated by oxygen adsorption are set forth in Table 8 below. Further experiments were carried out with the case where a polymeric ligand consisted of polyvinylpyridine and a compound capable of interaction therewith was formed of polyglutamic acid.

Table 8

Parameter n (Hill constant) of the allosteric effect displayed by a polymer-heme complex (measured in a buffer solution of phosphoric acid of pH 12) and variation of free energy released

| Polymeric ligand (molecular weight) | Hill constant (n) | $-\Delta F$ (Kcal/mol) |
|---|---|---|
| Poly-L-lysine (10,000) | 2.05 | 11.1 |
| Poly-L-Lysine + polyethylene glycol (25,000) | 1.39 | 7.0 |
| Polyvinylpyridine* (5,000) | 1.13 | 2.6 |
| Poly-L-Lysine + polyglutamic acid (50,000) | 1.84 | 10.2 |

*measured in dimethylformamide

What is claimed is:

1. A polymeric composite metal complex which comprises a polymeric metal complex whose central metal is a low valency transition metal selected from the group consisting of metals belonging to Groups VIA, VIIA, VIII, IB and IIB of the fourth to the sixth periods of the periodic table, whose planar ligand is a quadri-dentate monomeric ligand chelate, and whose axial ligand is a polymeric ligand containing a functional group having a coordinating capacity; and one or more addition compounds capable of interaction with said polymeric metal complex, wherein the addition compound is a polyanion which is an acid selected from the group consisting of polycrylic acid, polymethacrylic acid, polyitaconic acid, polyglutamic acid, pectic acid and alginic acid.

2. A polymeric composite metal complex which comprises a polymeric metal complex whose central metal is a low valency transition metal selected from the group consisting of metals belonging to Groups VIA, VIIA, VIII, IB and IIB of the fourth to the sixth periods of the periodic table, whose planar ligand is a quadridentate monomeric ligand chelate, and whose axial ligand is a polymeric ligand containing a functional group having a coordinating capacity; and one or more addition compounds capable of interaction with said polymeric metal complex; wherein the addition compound is a hydrogen-bonding type of polymeric compound containing a group selected from the group consisting of an aromatic ring having a nitrogen atom as a ring constituent, an amino group, an amide group, a carbonyl group, a carboxyl group, a hydroxyethyl group, a formyl group, a hydroxy group and ether group.

3. A polymeric composite metal complex which comprises a polymeric metal complex whose central metal is a low valency transition metal selected from the group consisting of metals belonging to Groups VIA, VIIA, VIII, IB and IIB of the fourth to the sixth periods of the periodic table, whose planar ligand is a quadridentate monomeric ligand chelate, and whose axial ligand is a polymeric ligand containing a functional group having a coordinating capacity; and one or more addition compounds capable of interaction with said polymeric metal complex, wherein the addition compound is a surface active agent selected from the group consisting of sodium lauryl sulfate and cetyl trimethyl ammonium chloride.

4. A method of preparing a polymeric metal complex which comprises (A) reacting a monomeric metal complex whose central metal is a low or high valency transition metal selected from the group consisting of metals belonging to Groups VIA, VIIA, VIII, IB and IIB of the fourth to the sixth periods of the periodic table and whose ligand consists of a quadri-dentate chelate ligand with a polymeric ligand to replace the axial ligand of said monomeric metal complex by said polymeric ligand; or (B) bonding the residual group of a polymeric compound with the central metal of the monomeric metal complex to provide a $\sigma$ bond between carbon mdetal, and, where the central metal of the monomeric metal complex is a high valency transition metal, reducing said central metal back to a low valency state by carrying out a chemical reaction using a reducing agent or an electrode reaction before, after or simultaneously with the reaction (A) or (B), wherein the residual group of the polymeric compound contains a group selected from the group consisting of a halogenated alkyl group, a hydroxyl group and a carbonyl group.

5. A method according to claim 4, wherein the residual group of the polymeric compound is a copolymer of p-(chloromethyl)styrene or chloroethyl vinyl ether with N-vinylpyrrolidone, acrylamide or acrylic acid.

6. A method of preparing a polymeric composite metal complex which comprises reacting (A) a monomeric metal complex whose central metal is a low or high valency transition metal selected from the group consisting of metals belonging to Groups VIA, VIIA, VIII, IB and IIB of the fourth to the sixth periods of the periodic table and whose ligand is a quadri-dentate ligand with a polymeric ligand to replace the axial ligand of said monomeric metal complex by the polymeric ligand; or (B) bonding the residual group of a polymeric compound with the central metal of the monomeric metal complex to the central metal of the monomeric metal complex to provide a $\sigma$ bond between carbon and metal; and (C) reacting the polymeric metal complex thus prepared with a compound capable of interaction therewith for stabilization of said polymeric metal complex system, and, where the central metal of the monomeric metal complex is a high valency transition metal, carrying out a chemical reaction using a reducing agent or electrode reaction to reduce said central metal back to a low valency state before, after or simultaneously with the reaction (C), wherein the compound capable of interaction is a polyanion selected from the group consisting of a polyacrylic acid, polymethacrylic acid, polyitaconic acid, polyglutamic acid, pectic acid and alginic acid.

7. A method of preparing a polymeric composite metal complex which comprises reacting (A) a monomeric metal complex whose central metal is a low or high valency transition metal selected from the group consisting of metals belonging to Groups VIA, VIIA, VIII, IB and IIB of the fourth to the sixth periods of the periodic table and whose ligand is a quadri-dentate ligand with a polymeric ligand to replace the axial ligand of said monomeric metal complex by the polymeric ligand; or (B) bonding the residual group of a polymeric compound with the central metal of the monomeric metal complex to provide a bond between carbon and metal; and (C) reacting the polymeric metal complex thus prepared with a compound capable of interaction therewith for stabilization of said polymeric metal complex system, and, where the central metal of the monomeric metal complex is a high valency transition metal, carrying out a chemical reaction using a reducing agent or electrode reaction to reduce said central metal back to a low valency state before, after or simultaneously with the reaction (C), wherein the compound capable of interaction is a hydrogen-bonding type of polymeric compound containing a group selected from the group consisting of an aromatic ring having a nitrogen atom as a ring constituent, an amino group, an amide group, a carbonyl group, a carboxyl group, a hydroxyethyl group, a formyl group and a hydroxy group.

8. A method of preparing a polymeric composite metal complex which comprises reacting (A) a monomeric metal complex whose central metal is a low or high valency transition metal selected from the group consisting of metals belonging to Groups VIA, VIIA, VIII, IB and IIB of the fourth to the sixth periods of the periodic table and whose ligand is a quadri-dentate ligand with a polymeric ligand to replace the axial ligand of said monomeric metal complex by the polymeric ligand; or (B) bonding the residual group of a polymeric compound with the central metal of the monomeric metal complex to provide a $\sigma$ bond between carbon and metal; and (C) reacting the polymeric metal complex thus prepared with a compound capable of interaction therewith for stabilization of said polymeric metal complex system, and, where the central metal of the monomeric metal complex is a high valency transition metal, carrying out a chemical reaction using a reducing agent or electrode reaction to reduce said central metal back to a low valency state before, after or simultaneously with the reaction (C), wherein the compound capable of interaction is selected from the group consisting of electron donor polymers and electron acceptor polymers, wherein the acceptor polymer is a copolymer of vinylpyridine or vinylimidazole with acrylonitrile, fumaronitrile or maleic anhydride.

9. A method of preparing a polymeric composite metal complex which comprises reacting (A) a monomeric metal complex whose central metal is a low or high valency transition metal selected from the group consisting of metals belonging to Groups VIA, VIIA, VIII, IB and IIB of the fourth to the sixth periods of the periodic table and whose ligand is a quadri-dentate ligand with a polymeric ligand to replace the axial ligand of said monomeric metal complex by the polymeric ligand, or (B) bonding the residual group of a polymeric compound with the central metal of the monomeric metal complex to provide a $\sigma$ bond between carbon and metal; and (C) reacting the polymeric metal complex thus prepared with a compound capable of interaction therewith for stabilization of said polymeric metal complex system, and, where the central metal of the monomeric metal complex is a high valency transition metal, carrying out a chemical reaction using a reducing agent or electrode reaction to reduce said central metal back to a low valency state before, after or simultaneously with the reaction (C), wherein the compound capable of interaction is a surface active agent selected from the group consisting of sodium lauryl sulfate and cetyl trimethyl ammonium chloride.

* * * * *